United States Patent Office 3,795,544
Patented Mar. 5, 1974

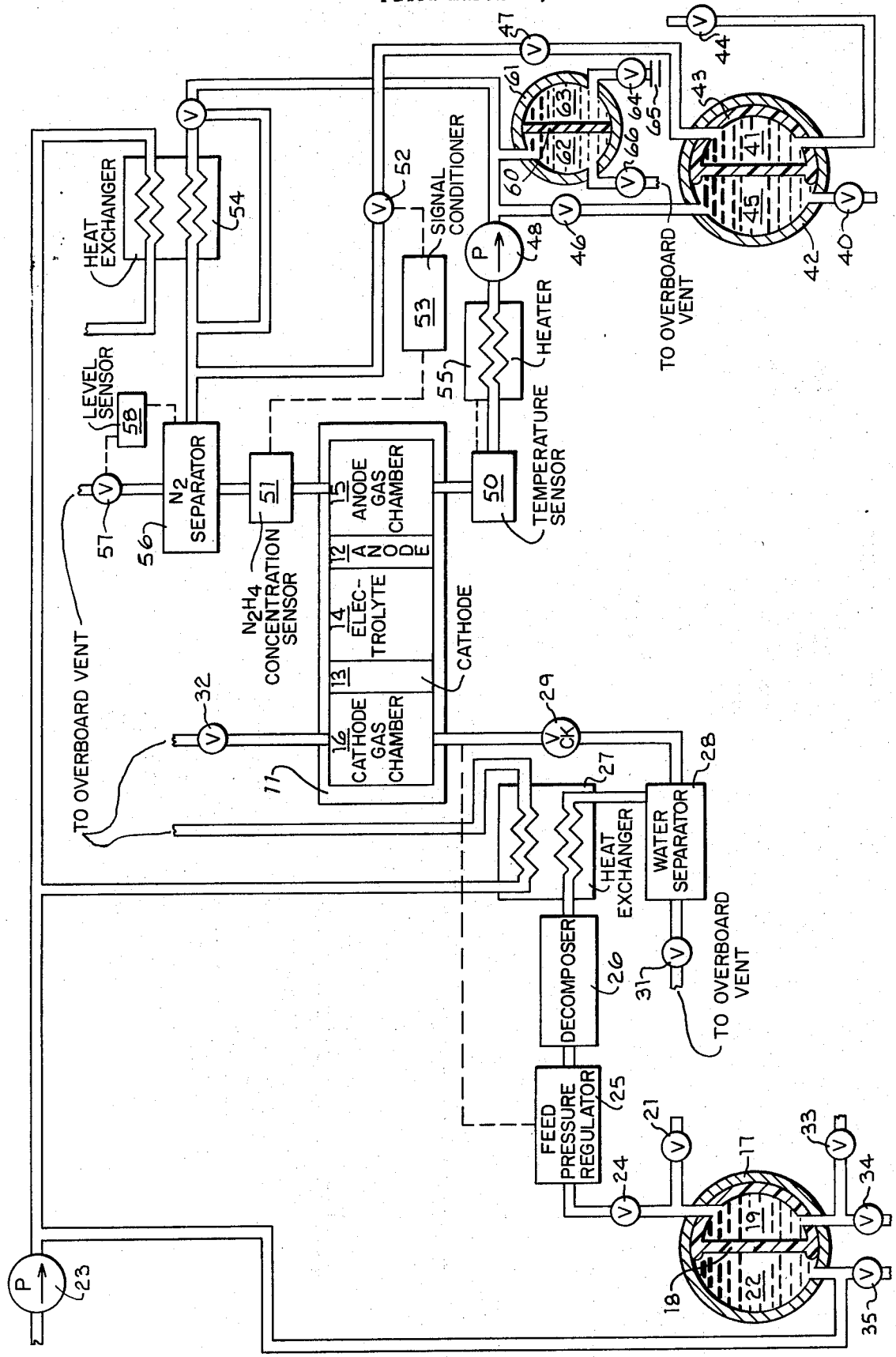

3,795,544
PRESSURE BALANCED FUEL CELL SYSTEM
FOR UNDERWATER VEHICLE
Joseph V. Clausi, Portland, Michael B. Landau, Hartford, Loren H. Otter, Bolton, and Richard D. Sawyer, Canton, Conn., assignors to the United States of America as represented by the Secretary of the Navy
Filed Mar. 30, 1972, Ser. No. 239,580
Int. Cl. H01m 27/00, 27/12
U.S. Cl. 136—86 B                    5 Claims

ABSTRACT OF THE DISCLOSURE

A pressure balanced fuel cell system for an underwater vehicle having at least one fuel cell module for supplying electrical power for said vehicle. A first compartmented tank having a resilient separator is provided for supplying fuel for an oxygen generation system, and a second compartmented tank having a resilient separator is provided for supplying enriched anolyte to the fuel cell. Pressure balance is maintained in the first compartmented tank by sea water and in the second compartmented tank by the spent anolyte recovered from the fuel cell module.

BACKGROUND OF THE INVENTION

The present invention relates to a fuel cell system suitable for use in an underwater vehicle.

Fuel cells and fuel cell systems have been used in the past for generating electricity. An electromotive force is produced by bringing an oxidant and a fuel in contact with two suitable electrodes and an electrolyte. A fuel is introduced at one electrode where it reacts electrochemically with the electrolyte to impart electrons to the fuel electrode. Simultaneously an oxidant is introduced to the second electrode where it reacts electrochemically with the electrolyte to consume electrons at the oxidant electrode. Connecting the two electrodes through an external circuit causes an electrical current to flow in the circuit and withdraws electrical power from the cell. The overall fuel cell reaction produces electrical energy which is the sum of the separate half cell reactions. A by-product of the reaction is formed as well as some heat.

There are two prime requirements for fuel cells which are to be used in space vehicles or underwater vehicles. The first consideration is that of safety, for either an explosion or a malfunction could result in loss of life of personnel using the vehicle. The second consideration is size and weight as these items are often of a critical nature.

SUMMARY OF THE INVENTION

The present invention relates to a fuel cell system for providing electrical energy for an underwater vehicle. One or more fuel cell modules are provided and a fuel is supplied from a first compartmented tank and an oxidant is supplied from a second compartmented tank. The tanks are divided by a resilient membrane or bladder and sea water is used in one compartment of the oxidant tank to provide a pressure balance and the spent fuel is returned to one compartment of the fuel tank to provide a pressure balance. Sea water is used for cooling the various components of the system.

BRIEF DESCRIPTION OF THE DRAWING

The figure of the drawing is a schematic representation of a preferred embodiment of the present invention.

DESCRIPTION OF THE PREFERRED EMBODIMENT

Referring now to the drawing, a fuel cell module 11 is shown having an anode 12 and a cathode 13 which are separated by an electrolyte 14. An anode gas chamber 15 is positioned adjacent anode 12 and a cathode gas chamber 16 is positioned adjacent cathode 13. In the preferred embodiment of this invention, oxygen is supplied to the cathode gas chamber 16 and is generated from the decomposition of hydrogen peroxide. A tank 17 is provided with a bladder 18 which provides two compartments. Hydrogen peroxide 19 is supplied to bladder 18 through fill valve 21, and after a quantity of hydrogen peroxide is filled into bladder 18, fill valve 21 is closed. By way of example, tank 17 might be constructed of molded Fiberglas cloth reinforced with an epoxy resin. Pressurization of bladder 18 containing hydrogen peroxide is provided by sea water 22 which is supplied by a main coolant pump 23. A dump valve 33 and vent relief valve 34 are provided for tank 17 for the hydrogen peroxide compartment and a dump valve 35 is provided for the sea water compartment.

Hydrogen peroxide 19 is fed from pressurized bladder 18 through shut-off valve 24 and feed pressure regulator 25 to decomposer 26. Decomposer 26 decomposes hydrogen peroxide 19 exothermically in a catalyst bed to produce oxygen and water vapor. The oxygen is cooled and the water condensed in a seawater cooled heat exchanger 27. The water is then separated and collected in water separator 28 and the oxygen is then piped through check valve 29 to cathode gas chamber 16. Water separator 28 is a bafflel tank with a water collection chamber at the bottom and water is periodically vented from this chamber through vent valve 31. As decomposer 26 produces oxygen on demand to maintain the system pressure and supply fuel cell module 11, a throttleable hydrogen peroxide feed system is required to control the flow rate to decomposer 26 and this function is supplied by the feed pressure regulator 25. Feed pressure regulator 25 senses the differential between the oxygen pressure at the inlet to fuel cell module 11 and the ambient pressures and meters the flow of hydrogen peroxide to maintain this differential at a constant value.

Anolyte 41 is supplied in a concentrated form to tank 42 which, like tank 17, might be constructed of molded Fiberglas cloth reinforced with an epoxy resin. A bladder 43 is provided inside tank 42 thereby dividing tank 42 into two compartments. Concentrated anolyte 41 is filled into bladder 43 through fill valve 44 and spent anolyte 45 is stored in the other compartment of tank 42. After a quantity of anolyte is filled into bladder 43, fill valve 44 is closed. Operation of the anolyte system is initiated by opening isolation valve 46 and feed valve 47. Spent anolyte from the discharge side of pump 48 is returned to supply tank 42 through isolation valve 46. The spent anolyte 45 pressurizes the fuel in bladder 43 and the fuel is drawn from the top of tank 42 to prevent accumulation of hydrazine decomposition gases (nitrogen and ammonia) in tank 42. By way of example, anolyte 41 might be a mixture of 50% $N_2H_4$, 20% KOH, and 30% water.

Anolyte 41 from tank 42 passes through a hydrazine concentration sensor 51, into anode gas chamber 15 and is recirculated by pump 48. When the desired hydrazine concentration is low, a solenoid valve 52 is opened to admit fresh anolyte with the circulating anolyte. By way of example, sensor 51 consists of two electrodes inserted into the effluent anolyte and a constant current density is maintained across the electrodes. Hydrazine is electrolyzed, preferentially to water, provided hydrazine can diffuse to the electrodes fast enough to support the electrolysis current. If the current density imposed exceeds the limiting current for hydrazine diffusion, electrolysis of water will occur at a voltage considerably higher than that for hydrazine electrolysis. The limiting current density varies with bulk hydrazine concentration. By setting the current density on the sensor to the limiting current density characteristic of the desired hydrazine concentration, a sharp rise in voltage output occurs when hydrazine concentration falls below the desired level. Actuated by this voltage rise, a signal conditioner 53 energizes solenoid valve 52 to admit fresh anolyte 41 into the circulating anolyte.

Signal conditioner 53 is comprised of a comparator circuit and an electronic switch. The comparator circuit senses the output voltage from sensor 51 and compares it with a reference voltage. When the sensor voltage rises above the reference voltage, the electronic switching circuit is triggered to provide sufficient power to operate, and open, solenoid valve 52. When the hydrazine concentration exceeds a specified level (about 2%) signal conditioner 53 removes power from solenoid valve 52 thereby allowing solenoid valve 52 to return to its normally closed position. Stack temperature of the anode gas chamber 15 is maintained and waste heat removal is regulated by bypassing anolyte around an anolyte-seawater heat exchanger 54 to keep a temperature between 105 and 110 degrees F. in the anolyte return to the stacks. An auxiliary electric heater 55 is provided for maintaining a desired anolyte temperature at low loads.

Spent anolyte 45, containing fuel cell product water, displaces fresh anolyte 41 from storage tank 42. The anolyte circulating pump maintains a positive pressure differential between tank 42 and the recirculating loop. When the anolyte feed control solenoid valve 52 opens upon signal from signal conditioner 53, the excess pressure of spent anolyte 45 forces fresh anolyte 41 into the anolyte circulation loop.

Nitrogen from hydrazine consumption is vented intermittently from a nitrogen separator tank 56 through a soleoid valve 57 which receives a signal from an anolyte level sensor 58. During rapid ascent of an underwater vehicle, expansion of nitrogen in separator tank 56 causes continuous venting of nitrogen. An anolyte accumulator tank 61 is provided to reference the suction side of pump 48 to sea pressure and provide a reservoir to accommodate anolyte volume changes during a mission. Anolyte 62 in tank 61 communicates with sea pressure through a flexible plastic diaphragm 60, effecting pressure balance of the anolyte loop. Due to accumulation of product water, the volume of anolyte 62 expands during a mission and expansion in excess of that provided for by anolyte storage in tank 61 is accommodated by expelling seawater 63 from tank 61. A filter 64 and overboard vent 65 are connected to tank 61 to permit seawater 63 to flood one compartment of tank 61.

We claim:

1. A fuel cell system for an underwater vehicle comprising,
    a fuel cell having an anode and a cathode separated by an electrolyte, a cathode gas chamber adjacent said cathode, and an anode gas chamber adjacent said anode,
    a first supply tank having first and second compartments separated by resilient material,
    an oxidizing material in said first compartment of said first supply tank and seawater in said second compartment for pressurizing said first compartment,
    means for supplying oxidizing material from said first compartment of said first supply tank to said cathode gas chamber,
    a second supply tank having first and second compartments separated by resilient material,
    a supply of fresh anolyte in said first compartment of said second supply tank and a supply of spent anolyte in said second compartment of said second supply tank,
    means for supplying fresh anolyte from said first compartment of said second supply tank to said anode gas chamber, and
    means for supplying spent anolyte from said anode gas chamber to said second compartment of said second supply tank whereby said spent anolyte in said second compartment of said second supply tank cooperates with said resilient material to pressurize said fresh anolyte thereby forcing said fresh anolyte in said first compartment of said second supply tank thereby forcing said fresh anolyte into said anode gas chamber.

2. A fuel cell system for an underwater vehicle as set forth in claim 1 wherein said first supply tank contains a bladder for providing first and second compartments and said bladder contains a supply of hydrogen peroxide, and means for decomposing hydrogen peroxide to supply oxygen to said cathode gas chamber.

3. A fuel cell system for an underwater vehicle as set forth in claim 1 wherein said second supply tank contains a bladder for providing first and second compartments and said bladder in said second supply tank contains a mixture of hydrazine, potassium hydroxide and water, and means for recirculating said mixture of hydrazine, potassium hydroxide and water through said anode gas chamber.

4. A fuel cell system for an underwater vehicle as set forth in claim 3 having means for maintaining a specific level of hydrazine recirculating through said anode gas chamber.

5. A fuel cell system for an underwater vehicle as set forth in claim 3 wherein said means for recirculating said mixture of hydrazine, potassium hydroxide and water includes an accumulator storage tank for storing an excess mixture of hydrazine, potassium hydroxide, water and waste products from said anode gas chamber.

References Cited
UNITED STATES PATENTS

| 3,565,691 | 2/1971 | Strier et al. | 136—86 R |
| 2,921,111 | 1/1960 | Crowley et al. | 136—100 |

HELEN M. McCARTHY, Primary Examiner

H. A. FEELEY, Assistant Examiner

PO-1050
(5/69)

UNITED STATES PATENT OFFICE
CERTIFICATE OF CORRECTION

Patent No. 3,795,544  Dated March 5, 1974

Inventor(s) J. V. CLAUSI ET AL

It is certified that error appears in the above-identified patent and that said Letters Patent are hereby corrected as shown below:

Column 4, line 22, delete "thereby"
             Line 23, delete "forcing said fresh anolyte"

Signed and sealed this 8th day of October 1974.

(SEAL)
Attest:

McCOY M. GIBSON JR.
Attesting Officer

C. MARSHALL DANN
Commissioner of Patents